(12) United States Patent
Sasabayashi et al.

(10) Patent No.: US 11,201,015 B2
(45) Date of Patent: Dec. 14, 2021

(54) MULTILAYER TYPE ELECTRONIC COMPONENT

(71) Applicant: Murata Manufacturing Co., Ltd., Nagaokakyo (JP)

(72) Inventors: Takehisa Sasabayashi, Nagaokakyo (JP); Kenjiro Gomi, Nagaokakyo (JP); Kenji Kimura, Nagaokakyo (JP); Wataru Oshima, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

(21) Appl. No.: 16/916,804

(22) Filed: Jun. 30, 2020

(65) Prior Publication Data

US 2021/0020376 A1    Jan. 21, 2021

(30) Foreign Application Priority Data

Jul. 19, 2019  (JP) .............................. JP2019-134096

(51) Int. Cl.
*H01G 4/30*  (2006.01)
*H01G 4/12*  (2006.01)
*H01G 4/012*  (2006.01)
*H01G 4/248*  (2006.01)

(52) U.S. Cl.
CPC .............. *H01G 4/30* (2013.01); *H01G 4/012* (2013.01); *H01G 4/1227* (2013.01); *H01G 4/248* (2013.01)

(58) Field of Classification Search
CPC ........ H01G 4/30; H01G 4/012; H01G 4/1227; H01G 4/2325; H01G 4/1209; H01G 4/228; H01G 4/306; H01G 4/248
See application file for complete search history.

(56) References Cited

U.S. PATENT DOCUMENTS

| | | | |
|---|---|---|---|
| 6,829,136 B2 | 12/2004 | Nakamura et al. | |
| 9,287,046 B2 | 3/2016 | Morita et al. | |
| 9,666,370 B2 * | 5/2017 | Wada ................ | C04B 35/62685 |
| 2004/0105214 A1 | 6/2004 | Nakamura et al. | |
| 2015/0036264 A1 | 2/2015 | Morita et al. | |

(Continued)

FOREIGN PATENT DOCUMENTS

CN      1505072 A      6/2004
JP   2013229551 A     11/2013

OTHER PUBLICATIONS

Chinese First Office Action for Chinese Application No. 202010689062.3, dated Sep. 24, 2021.

*Primary Examiner* — Michael P McFadden
(74) *Attorney, Agent, or Firm* — Arent Fox LLP

(57) ABSTRACT

A multilayer electronic component having a plurality of laminated dielectric layers and inner electrode layers. The dielectric layers have a plurality of crystal grains including first regions where Re is dissolved in a solid state; and second regions where Re is not dissolved in the solid state. A median size of the crystal grains to an average thickness of the dielectric layers is $0.5 \leq t \leq 0.7$. A ratio of a sum of cross sectional areas of the first regions to those of the plurality of crystal grains is $0.7 \leq s \leq 0.9$. When a total amount of Ti, Zr, and Hf is 100 molar parts in the dielectric layers, a sum of the Zr and the Hf is $0 \leq a \leq 1.0$; an amount b of Si is $0.1 \leq b \leq 1.0$; an amount c of Re is $0.5 \leq c \leq 10.0$; and a ratio m of a total of Ba and Re to a total of Ti, Zr, and Hf is $0.990 \leq m \leq 1.050$.

8 Claims, 2 Drawing Sheets

(56) References Cited

U.S. PATENT DOCUMENTS

| | | | |
|---|---|---|---|
| 2015/0274597 A1* | 10/2015 | Morigasaki | C04B 35/638 |
| | | | 428/697 |
| 2015/0287535 A1* | 10/2015 | Nakanishi | H01G 4/1245 |
| | | | 361/301.4 |
| 2016/0172107 A1* | 6/2016 | Yoon | C04B 35/4682 |
| | | | 361/301.4 |
| 2017/0178812 A1* | 6/2017 | Shimada | H01G 4/1227 |
| 2019/0218146 A1* | 7/2019 | Banno | H01G 4/012 |
| 2019/0241476 A1* | 8/2019 | Nomura | C04B 35/468 |

* cited by examiner

MULTILAYER TYPE ELECTRONIC COMPONENT

CROSS REFERENCE TO RELATED APPLICATIONS

The present application claims priority to Japanese Patent Application No. 2019-134096, filed Jul. 19, 2019, the entire contents of which is incorporated herein by reference.

BACKGROUND OF THE INVENTION

Field of the Invention

The present disclosure relates to a multilayer type electronic component.

Description of the Background Art

A multilayer type electronic component such as a multilayer ceramic capacitor has been applied to an electronic device required to have high reliability, such as an in-vehicle device. The term "reliability" in this specification refers to a length of time (hereinafter, also referred to as "high temperature load life") in which an insulation resistance is decreased to a predetermined value in a high temperature load test. One example of such a multilayer type electronic component is a multilayer ceramic capacitor described in Japanese Patent Laying-Open No. 2013-229551.

SUMMARY OF THE INVENTION

In Japanese Patent Laying-Open No. 2013-229551, reliability is improved by attaining reduced sizes of crystal grains so as to increase the number of grain boundaries between the crystal grains in the thickness direction of a dielectric layer. On the other hand, due to a so-called size effect, these reduced sizes of the crystal grains lead to a decrease in the dielectric constant of the dielectric layer. To address this, in Japanese Patent Laying-Open No. 2013-229551, the decrease in the dielectric constant is suppressed by adjusting a dielectric composition.

However, when the dielectric layer is thinned, it may be difficult to attain the reduced sizes of the crystal grains so as to secure reliability while maintaining the capacitance of the multilayer ceramic capacitor.

The present disclosure has an object to provide a multilayer type electronic component in which high reliability is secured even when the number of crystal grains is small in the thickness direction of a dielectric layer.

A multilayer type electronic component according to the present disclosure includes a multilayer body including a plurality of laminated dielectric layers and a plurality of inner electrode layers alternately arranged between adjacent dielectric layers of the plurality of laminated dielectric layers. Each of the plurality of laminated dielectric layers includes elements Ba, Ti, Zr, Hf, Si, and Re. Re is at least one element selected from Gd, Dy, Ho, Er, and Y. An average thickness of each of the plurality of laminated dielectric layers is less than or equal to 0.5 Each of the plurality of laminated dielectric layers has a plurality of crystal grains with first regions and second regions, each of the first regions having the Re dissolved in a solid state, and each of the second regions not having the Re dissolved in the solid state. A ratio t of a median size of the plurality of crystal grains to the average thickness of the dielectric layer is $0.5 \leq t \leq 0.7$.

In a cross section along a thickness direction of the dielectric layer, a ratio s of a sum of cross sectional areas of the first regions to a sum of cross sectional areas of the plurality of crystal grains is $0.7 \leq s \leq 0.9$. Where each of amounts of the elements included in the dielectric layer is expressed in molar parts, when a total of an amount of Ti, an amount of Zr, and an amount of Hf is set to be 100, a sum a of the amount of Zr and the amount of Hf is $0 \leq a \leq 1.0$; an amount b of Si is $0.1 \leq b \leq 1.0$; and amount c of Re is $0.5 \leq c \leq 10.0$; and a ratio m of a total of an amount of Ba and an amount of Re to the total of the amount of Ti, the amount of Zr, and the amount of Hf is $0.990 \leq m \leq 1.050$.

In the multilayer type electronic component according to the present disclosure, high reliability can be secured even when the number of crystal grains is small in the thickness direction of the dielectric layer.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
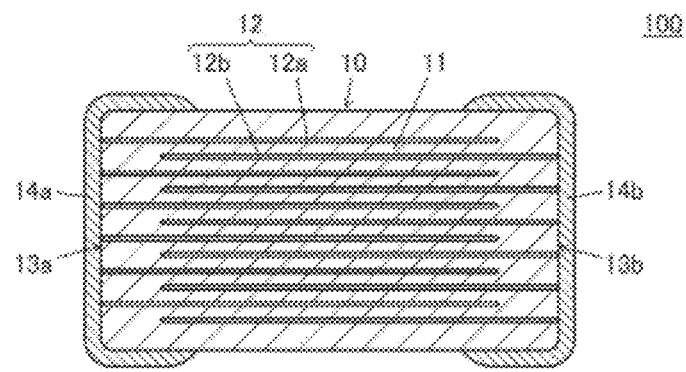
FIG. 1 is a cross sectional view of a multilayer ceramic capacitor 100, which is an embodiment of a multilayer type electronic component according to the present disclosure.

Features of the present disclosure will be described with reference to the figures. It should be noted that in a below-described embodiment of a multilayer type electronic component, the same or common portions are given the same reference characters in the figures and may not be repeatedly described.

—Embodiment of Multilayer Type Electronic Component—

With reference to FIG. 1 to FIG. 5, the following describes a multilayer ceramic capacitor 100 representing an embodiment of a multilayer type electronic component according to the present disclosure.

<Structure of Multilayer Ceramic Capacitor>

The following describes a structure of multilayer ceramic capacitor 100. FIG. 1 is a cross sectional view of multilayer ceramic capacitor 100. Multilayer ceramic capacitor 100 includes a multilayer body 10. Multilayer body 10 includes a plurality of laminated dielectric layers 11 and a plurality of inner electrode layers 12 alternately arranged between adjacent dielectric layers of the plurality of laminated dielectric layers.

Each of dielectric layers 11 includes elements Ba, Ti, Zr, Hf, Si, and Re, where Re is at least one element selected from Gd, Dy, Ho, Er, and Y. Dielectric layer 11 has a plurality of crystal grains G (which will be described later with reference to FIG. 3) including a perovskite type compound having $Ba(Ti,Zr,Hf)O_3$ as its basic structure.

Figure 5:
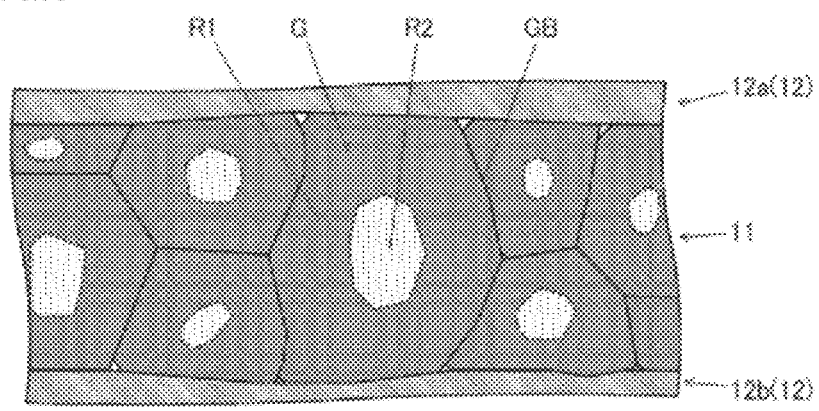
FIG. 5 is a schematic view of a mapping image of Dy at a region shown in FIG. 4, the mapping image being provided by energy dispersive X-ray spectroscopy (which may be abbreviated as EDX in the description below).

It should be noted that in at least parts of the plurality of crystal grains G, first regions R1 and second regions R2 exist (see FIG. 5). Each of first regions R1 is a region in which the Re is dissolved in a solid state. Each of second regions R2 is a region in which the Re is not dissolved in the solid state. Moreover, the Si exists at a grain boundary GB between crystal grains G, and is partially dissolved in crystal grains G in the solid state. The fine structure of such a dielectric layer 11 will be described later.

Figure 2:
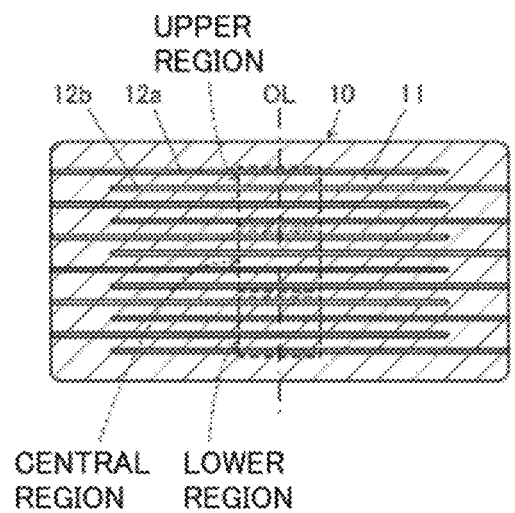
FIG. 2 is a cross sectional view of a sample prepared in order to examine average thickness and fine structure of a dielectric layer 11.

In multilayer ceramic capacitor 100, the average thickness of dielectric layer 11 having the plurality of crystal grains G is less than or equal to 0.5 The average thickness of dielectric layer 11 can be measured as follows. FIG. 2 is a cross sectional view of a sample prepared in order to examine the average thickness and fine structure (described below) of dielectric layer 11. First, in order to expose a cross section (surface shown in FIG. 1) defined by the length and thickness of multilayer body 10, polishing was performed up to a depth of about ½ in the width direction. In order to eliminate elongation of inner electrode layer 12 caused by the polishing, the cross section was processed by ion milling.

In the obtained multilayer body having been polished, an imaginary line OL was assumed to be orthogonal to inner electrode layers 12 in the vicinity of a central portion in the length direction of the cross section as shown in FIG. 2. Then, a region having dielectric layers 11, first inner electrode layers 12a, and second inner electrode layers 12b laminated therein for obtaining a capacitance of the polished body was equally divided in the lamination direction along imaginary line OL into the following three regions: an upper region, a central region, and a lower region.

The thickness of each dielectric layer 11 was found by performing image analysis of a SEM observation image at a corresponding one of central portions of the respective regions on imaginary line OL. It should be noted that in each of the regions, the measurement of the thickness was performed to exclude a portion in which two or more dielectric layers 11 are observed to be connected to each other due to absence of outermost dielectric layer 11 and inner electrode layer 12. The average thickness of dielectric layer 11 was obtained by calculating the arithmetic mean of thicknesses at a plurality of locations (more than or equal to ten locations) in dielectric layer 11. As a result, it was confirmed that the average thickness of dielectric layer 11 was less than or equal to 0.5 μm.

In multilayer ceramic capacitor 100, even though the average thickness of dielectric layer 11 is less than or equal to 0.5 μm, high reliability can be secured because dielectric layer 11 has a below-described composition.

The plurality of inner electrode layers 12 have a first inner electrode layer 12a and a second inner electrode layer 12b. A form of each of the crystal grains included in each inner electrode layer 12 will be described later. As a conductive material for inner electrode layer 12, it is possible to use: at least one metal selected from Ni, a Ni alloy, Cu, and a Cu alloy; or an alloy including the metal. Inner electrode layer 12 may further include dielectric particles, which are referred to as "coexisting material". The coexisting material is added upon calcining multilayer body 10 in order to provide inner electrode layer 12 with a sintering contraction characteristic close to that of dielectric layer 11. Any coexisting material may be employed as long as such an effect is exhibited.

First inner electrode layer 12a includes: a facing electrode portion facing second inner electrode layer 12b with dielectric layer 11 being interposed therebetween; and a drawn electrode portion extending from the facing electrode portion to a first end surface 13a of multilayer body 10. Second inner electrode layer 12b includes: a facing electrode portion facing first inner electrode layer 12a with dielectric layer 11 being interposed therebetween; and a drawn electrode portion extending from the facing electrode portion to a second end surface 13b of multilayer body 10. One capacitor element is formed by one first inner electrode layer 12a and one second inner electrode layer 12b facing each other with dielectric layer 11 being interposed therebetween.

Multilayer ceramic capacitor 100 further includes a first outer electrode 14a and a second outer electrode 14b. First outer electrode 14a is formed on first end surface 13a of multilayer body 10 so as to be electrically connected to first inner electrode layer 12a, and extends from first end surface 13a to a first main surface and a second main surface thereof as well as a first side surface and a second side surface thereof. Second outer electrode 14b is formed on second end surface 13b of multilayer body 10 so as to be electrically connected to second inner electrode layer 12b, and extends from second end surface 13b to the first main surface and the second main surface thereof as well as the first side surface and the second side surface thereof.

It can be said that multilayer ceramic capacitor 100 is configured such that the plurality of capacitor elements described above are connected in parallel via first outer electrode 14a and second outer electrode 14b.

Each of first outer electrode 14a and second outer electrode 14b has an underlying electrode layer and a plating layer disposed on the underlying electrode layer. The underlying electrode layer includes at least one selected from a sintered body layer, a conductive resin layer, and a metal thin film layer.

The sintered body layer is obtained by baking a paste including glass powder and metal powder, and includes a glass portion and a metal portion. Examples of glass for the glass portion can include $B_2O_3$—$SiO_2$—BaO-based glass and the like. Examples of a metal for the metal portion can include: at least one metal selected from Ni, Cu, Ag, and the like; or an alloy including the metal. A plurality of sintered body layers having different components may be formed. Moreover, in a below-described manufacturing method, the sintered body layer may be calcined together with multilayer body 10, or may be baked after multilayer body 10 is calcined.

For example, the conductive resin layer includes: conductive particles such as metal fine particles; and a resin portion. Examples of a metal for the conductive particles can include: at least one metal selected from Ni, Cu, Ag, and the like; or an alloy including the metal. Examples of a resin for the resin portion can include an epoxy-based thermosetting resin and the like. A plurality of conductive resin layers having different components may be formed.

The metal thin film layer is formed by a thin film forming method such as sputtering or vapor deposition. The metal thin film layer has a thickness of less than or equal to 1 μm and has the metal fine particles deposited therein. Examples of a metal for the metal thin film layer can include: at least one metal selected from Ni, Cu, Ag, Au, and the like; or an alloy including the metal. A plurality of metal thin film layers having different components may be formed.

Examples of a metal for the plating layer can include: at least one metal selected from Ni, Cu, Ag, Au, Sn, and the like; and an alloy including the metal. A plurality of plating layers having different components may be formed. Preferably, two plating layers, i.e., a Ni plating layer and a Sn plating layer are formed. The Ni plating layer can prevent the underlying electrode layer from being eroded by a solder when mounting the multilayer type electronic component. The Sn plating layer has excellent wettability with respect to a solder including Sn. Accordingly, mountability can be improved when mounting the multilayer type electronic component.

It should be noted that each of first outer electrode 14a and second outer electrode 14b may be a plating layer that is directly provided on multilayer body 10 and that is directly connected to a corresponding inner electrode layer. The plating layer preferably includes a first plating layer and a second plating layer provided on the first plating layer.

Examples of a metal for each of the first plating layer and the second plating layer can include: at least one metal selected from Cu, Ni, Sn, Au, Ag, Pd, Zn, and the like; or an alloy including the metal. For example, when Ni is used as the metal for inner electrode layer 12, Cu, which has excellent bondability with respect to Ni, is preferably used as the first plating layer. When Sn or Au is used, the metal for the first plating layer preferably has a solder barrier characteristic. Moreover, as the metal for the second plating layer, it is preferable to use Ni, which has excellent solder wettability.

<Fine Structure and Composition of Dielectric Layer>

Figure 3:
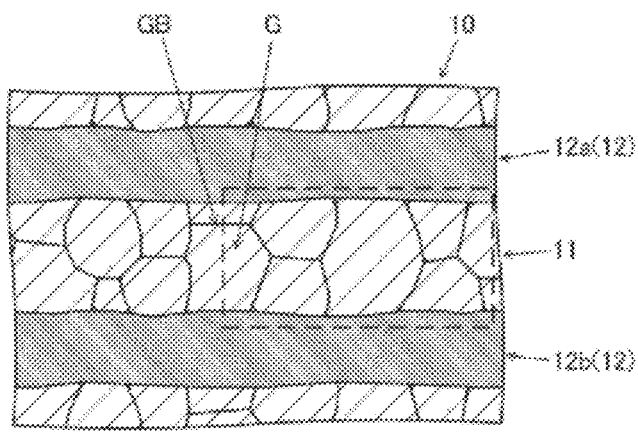
FIG. 3 is a schematic view of an observation image at a central region of FIG. 2, the observation image being provided by a scanning electron microscope (which may be abbreviated as SEM in the description below).

The following describes the fine structure of dielectric layer 11. FIG. 3 is a schematic view of a SEM observation image at the central region of FIG. 2. The SEM observation was performed using the sample prepared upon the measurement of the average thickness of dielectric layer 11.

As described below, dielectric layer 11 has the plurality of crystal grains G each including a perovskite type compound having $Ba(Ti,Zr,Hf)O_3$ as its basic structure. In dielectric layer 11, the number of crystal grains G existing in the thickness direction is small, with the result that the number of grain boundaries GB between crystal grains G is also small.

Specifically, in a distribution curve of the median size of the plurality of crystal grains G, i.e., integration percentage for the grain sizes, a ratio t of the grain size (D50) at an integration percentage of 50% to the average thickness of dielectric layer 11 falls within a range of $0.5 \leq t \leq 0.7$. It should be noted that the median size of the plurality of crystal grains G can be calculated based on an integration percentage distribution of equivalent circle diameters of crystal grains G obtained by the image analysis on the SEM observation image. When ratio t of the median size to the average thickness of dielectric layer 11 falls within the above-described range, crystal grains G included in dielectric layer 11 are large, with the result that a decrease in dielectric constant of dielectric layer 11 is suppressed by the size effect.

Figure 4:
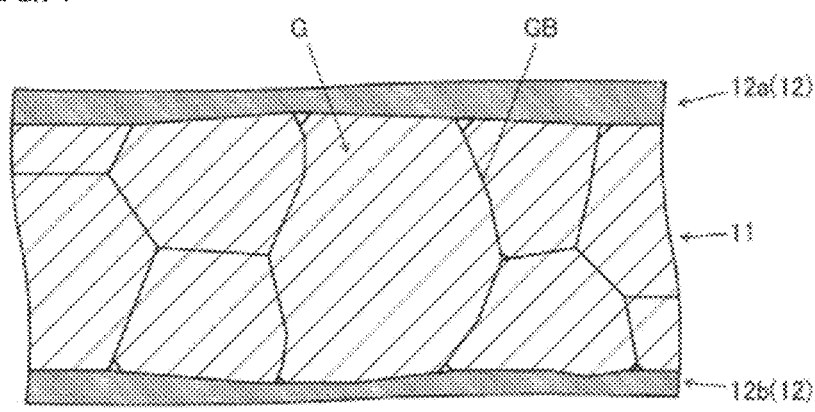
FIG. 4 is a schematic view of an observation image at a region indicated by a broken line portion in FIG. 3, the observation image being provided by a transmission electron microscope (which may be abbreviated as TEM in the description below).

FIG. 4 is a schematic view of a TEM observation image at the region indicated by a broken line in FIG. 3. Moreover, FIG. 5 is a schematic view of a mapping image of Dy by EDX at a region shown in FIG. 4. The following describes preparation of a sample for the TEM observation and EDX mapping.

Multilayer body 10 is polished from both sides in the width direction such that the central portion of multilayer body 10 in the width direction remains, thereby obtaining a polished body. As shown in FIG. 2, imaginary line OL was assumed to be orthogonal to inner electrode layers 12 in the vicinity of the central portion in the length direction. Then, a region having dielectric layers 11, first inner electrode layers 12a, and second inner electrode layers 12b laminated therein for obtaining a capacitance of the polished body was equally divided in the lamination direction along imaginary line OL into the following three regions: an upper region, a central region, and a lower region.

The upper region, the central region, and the lower region were cut out from the polished body, and were thinned by Ar ion milling or the like to obtain three thin film samples from each region. For the three thin film samples obtained from each of the upper region, the central region, and the lower region of multilayer body 10 as described above, TEM observation and element mapping using EDX accompanied with the TEM were performed.

FIG. 4 is a schematic view of the TEM observation image at the central region of FIG. 2. Moreover, FIG. 5 is also a schematic view of the mapping image of Re by the EDX at the central region of FIG. 2. Re represents a rare earth element. In each of the TEM observation image and the EDX mapping image, no significant difference was found between the central region and each of the upper and lower regions. Therefore, a result obtained from the central region described with reference to FIG. 4 and FIG. 5 is regarded as the fine structure of dielectric layer 11 of multilayer ceramic capacitor 100 according to the present disclosure.

As described above, ratio t of the median size of the plurality of crystal grains G to the average thickness of dielectric layer 11 falls within a range of $0.5 \leq t \leq 0.7$. Moreover, as shown in FIG. 5, in at least parts of the plurality of crystal grains G, first regions R1 and second regions R2 exist. Each of first regions R1 is a region in which Re, which represents a rare earth element, is dissolved in a solid state. Each of second regions R2 is a region in which Re is not dissolved in the solid state. It should be noted that the expression "Re is not dissolved in crystal grain G in the solid state" indicates that Re is less than or equal to a detection limit in the EDX mapping.

Here, each crystal grain G is configured to include the perovskite type compound having $Ba(Ti,Zr,Hf)O_3$ as its basic structure. Re is dissolved in crystal grain G in the solid state in the following manner: Re enters a Ba site of the perovskite type compound having $Ba(Ti,Zr,Hf)O_3$ as its basic structure. Moreover, although not shown in the figure, Si exists at a grain boundary GB between crystal grains G, and is partially dissolved in crystal grains G in the solid state.

In the cross section (surface shown in FIG. 5) along a thickness direction of dielectric layer 11, a ratio s of a sum of cross sectional areas of the first regions to a sum of cross sectional areas of the plurality of crystal grains is $0.7 \leq s \leq 0.9$. The sum of the cross sectional areas of first regions R1 and the sum of the cross sectional areas of crystal grains G were calculated by image analysis on the element mapping image by the EDX.

The following describes a significance of ratio s. In order to improve the reliability of the multilayer ceramic capacitor including the dielectric layer including the perovskite type compound having $BaTiO_3$ as its basic structure, it is necessary to suppress oxygen vacancies from moving in the dielectric layer when DC voltage is applied. For improved reliability, it is considered to be effective to substitute $Re^{3+}$ for $Ba^{2+}$ in the $BaTiO_3$ crystal lattice. $Ba^{2+}$ represents positive divalent ions of Ba, and $Re^{3+}$ represents positive trivalent ions of rare earth element Re (hereinafter, the notation of ions may be described in the same manner as described above).

When $Re^{3+}$ substitutes for $Ba^{2+}$ as described above, positive charges becomes excessive. Accordingly, Ba vacancies deemed to be charged to be relatively negative divalent are generated to satisfy an electrical neutrality condition. Such Ba vacancies and oxygen vacancies that can be deemed to be charged to be relatively positive divalent form stable defect pairs. Since the Ba vacancies are unlikely to be moved even when DC voltage is applied, the oxygen vacancies tied to the Ba vacancies are suppressed from being moved. It should be noted that if $Re^{3+}$ substitutes therefor too much, the dielectric constant of the dielectric layer is decreased.

Hence, when first region R1 is formed in crystal grain G at ratio s described above, high reliability can be secured as described below while suppressing decrease of the capacitance of multilayer ceramic capacitor 100.

Moreover, in multilayer ceramic capacitor 100, in the case where each of amounts of the elements included in dielectric layer 11 is expressed in molar parts, when the total of an amount of Ti, an amount of Zr, and an amount of Hf is assumed to be 100, the elements fall within following ranges: a sum a of the amount of Zr and the amount of Hf is 0≤a≤1.0; an amount b of Si is 0.1≤b≤1.0; and an amount c of Re is 0.5≤c≤10.0. Moreover, a ratio m of a total of an amount of Ba and the amount of Re to the total of the amount of Ti, the amount of Zr, and the amount of Hf is 0.990≤m≤1.050.

The amounts of the elements included in dielectric layer 11 are determined by dissolving multilayer body 10 using an acid and subjecting the obtained solution to high-frequency inductively coupled plasma emission spectroscopy (hereinafter, also referred to as "ICP analysis"). It should be noted that there is no particular limitation as to a method for performing dissolution treatment to form multilayer body 10 into the solution.

In this method, dielectric layer 11 and inner electrode layer 12 are dissolved simultaneously. Hence, not only the elements included in dielectric layer 11 but also the elements included in inner electrode layer 12 are detected during the analysis. Also, the elements known to be included in inner electrode layer 12 were excluded from the result of the above-described ICP analysis. This was deemed as a result of performing the ICP analysis onto the solution resulting from the dissolution treatment of dielectric layer 11. Moreover, the elements accordingly detected were expressed in molar part to be deemed as representing the amounts of the elements included in dielectric layer 11.

When first regions R1 are formed at the above-described ratio in crystal grains G of dielectric layer 11 and the amounts of the elements included in dielectric layer 11 satisfy the above-described ranges, high reliability can be secured. The reliability can be evaluated in the following procedure, for example.

That is, by performing a high temperature load test at a temperature of 150° C. under application of a DC voltage of 4 V, changes in resistance value of multilayer ceramic capacitors with passage of time are measured. An intensity of an electric field applied to dielectric layer 11 is 16 kV/mm when the thickness of dielectric layer 11 is 0.5 μm. For each of 100 multilayer ceramic capacitors, a time at which the resistance value becomes less than or equal to 100 kΩ is regarded as a time to failure. Based on a Weibull analysis for the times to failure, a mean time to failure (hereinafter, also referred to as "MTTF") is determined.

When the high temperature load test is performed under the above-described conditions, multilayer ceramic capacitor 100 has excellent reliability to have an MTTF of 50 hours or more. That is, even when the number of crystal grains G existing in the thickness direction of dielectric layer 11 is small, high reliability can be secured in multilayer ceramic capacitor 100.

In multilayer ceramic capacitor 100, a coefficient of variation CV of a variation in the thickness of dielectric layer 11 is preferably less than or equal to 15%. Coefficient of variation CV is determined by dividing, by the average thickness of dielectric layer 11, the standard deviation of the measured values (at ten or more points) of the thickness of dielectric layer 11. In this case, the variation in the thickness of dielectric layer 11 is suppressed, and formation of a thin portion is particularly suppressed. Hence, higher reliability can be secured. Coefficient of variation CV may be reduced by attaining a sharp particle size distribution of a dielectric raw material to suppress a variation in the grain sizes of the plurality of crystal grains G after calcination, for example.

Moreover, in multilayer ceramic capacitor 100, second region R2 is preferably surrounded by first region R1, i.e., a so-called core shell structure is preferable. In this case, second region R2 in which Re, a rare earth element, is not dissolved in the solid state does not exist to connect first inner electrode layer 12a and second inner electrode layer 12b. In other words, first region R1 in which Re is dissolved in the solid state exists between first inner electrode layer 12a and second inner electrode layer 12b, thereby effectively exhibiting the above-described effect of suppressing movement of the oxygen vacancies by the Ba vacancies.

Further, in multilayer ceramic capacitor 100, the amount b of Si preferably is 0.1≤b≤0.5.

As described above, Si exists at a grain boundary GB between crystal grains G, and is partially dissolved in crystal grains G in the solid state. It is presumed that Si is in an amorphous form together with another element such as Re and exists at grain boundary GB between crystal grains G. In multilayer ceramic capacitor 100, amount b of Si is 0.1≤b≤1.0. Hence, the reliability can be suppressed from being decreased due to occurrence of such a different phase. By further reducing amount b of Si as described above, the reliability can further be suppressed from being decreased by the occurrence of the different phase.

<Method for Manufacturing Multilayer Ceramic Capacitor>

A method for manufacturing multilayer ceramic capacitor 100 representing the embodiment of the multilayer type electronic component according to the present disclosure will be described in order of manufacturing steps. The method for manufacturing multilayer ceramic capacitor 100 includes the following steps.

The method for manufacturing multilayer ceramic capacitor 100 includes a step of obtaining a plurality of ceramic green sheets using powder (dielectric raw material powder) obtained by providing various additives onto surfaces of $Ba(Ti,Zr,Hf)O_3$ powder. It should be noted that the wording "green" is an expression indicating "before sintering," and will be used to mean so in the description below. Each of the ceramic green sheets includes a binder component in addition to the dielectric raw material powder. The binder component is not limited particularly.

The dielectric raw material powder can be produced by, for example, providing organic compounds serving as the additives onto the surfaces of the $Ba(Ti,Zr,Hf)O_3$ powder and performing calcination to burn organic components so as to attain such a state that the additives are provided on the surfaces of the $BaTiO_3$ powder in the form of oxides. However, it is not limited thereto. The additives may be provided in the form of organic compounds or in the mixed form of oxides and organic compounds.

For example, the $Ba(Ti,Zr,Hf)O_3$ powder can be obtained by calcining a mixture of $BaCO_3$ powder, $TiO_2$ powder, $ZrO_2$ powder and $HfO_2$ powder. It should be noted that $HfO_2$ may be an inevitable impurity of $ZrO_2$. Alternatively, the $Ba(Ti,Zr,Hf)O_3$ powder may be obtained by applying a Zr compound and a Hf compound to already prepared $BaTiO_3$ powder and performing calcination thereto.

The method for manufacturing multilayer ceramic capacitor 100 further includes a step of printing an inner electrode layer pattern onto the ceramic green sheet. A paste for the inner electrode layer includes: metal powder including one of Ni, a Ni alloy, Cu, and a Cu alloy; and powder (coexisting material) obtained by applying the various additives onto the surfaces of the $BaTiO_3$ powder. It should be noted that the coexisting material is not essential.

The above-described coexisting material can be prepared by, for example, providing organic compounds serving as the additives onto the surfaces of the $Ba(Ti,Zr,Hf)O_3$ powder and performing calcination to burn organic components so as to attain such a state that the additives are provided on the surfaces of the $BaTiO_3$ powder in the form of oxides. However, it is not limited thereto. The additives may be provided in the form of organic compounds or in the mixed form of oxides and organic compounds. Moreover, $BaTiO_3$ solid solution powder may be employed instead of the $BaTiO_3$ powder. The same or different powder(s) obtained by applying the various additives to the surfaces of the $BaTiO_3$ powder may be employed for the ceramic green sheet and the paste for inner electrode layer.

The method for manufacturing multilayer ceramic capacitor 100 also includes a step of obtaining a green multilayer body by laminating a plurality of ceramic green sheets having the inner electrode pattern formed thereon.

The method for manufacturing multilayer ceramic capacitor 100 further includes a step of obtaining a multilayer body including a plurality of laminated dielectric layers and a plurality of inner electrode layers by sintering the green multilayer body. In the above-described sintering step, the temperature may be increased rapidly at 100° C./second from 800° C. to the maximum temperature for sintering the multilayer body, for example.

The embodiments disclosed in this specification are illustrative and the invention of the present disclosure is not limited to the embodiments. The scope of the invention of the present disclosure is defined by the terms of the claims, and is intended to include any modifications within the scope and meaning equivalent to the terms of the claims. Moreover, various applications and modifications can be made within the above-described scope.

For example, various applications and modifications can be made within the scope of the present invention with regard to the number of the dielectric layers, the material of each dielectric layer, the number of the inner electrode layers, and the material of each inner electrode layer in the multilayer body. Moreover, although the multilayer ceramic capacitor has been illustrated as the multilayer type electronic component, the invention of the present disclosure is not limited thereto, and is applicable to a capacitor element or the like formed in a multilayer substrate.

Although the present invention has been described and illustrated in detail, it is clearly understood that the same is by way of illustration and example only and is not to be taken by way of limitation, the scope of the present invention being interpreted by the terms in the appended claims.

What is claimed is:
1. A multilayer electronic component comprising:
   a multilayer body including a plurality of laminated dielectric layers and a plurality of inner electrode layers alternately arranged between adjacent dielectric layers of the plurality of laminated dielectric layers, wherein
   each of the plurality of laminated dielectric layers includes elements Ba, Ti, Zr, Hf, Si, and Re, and Re is at least one element selected from Gd, Dy, Ho, Er, and Y,
   an average thickness of each of the plurality of laminated dielectric layers is less than or equal to 0.5 μm,
   each of the plurality of laminated dielectric layer has a plurality of crystal grains with first regions and second regions, each of the first regions having the Re dissolved in a solid state, and each of the second regions not having the Re dissolved in the solid state,
   a ratio t of a median size of the plurality of crystal grains to the average thickness of the dielectric layer is $0.5 \leq t \leq 0.7$,
   in a cross section along a thickness direction of the plurality of laminated dielectric layers, a ratio s of a sum of cross sectional areas of the first regions to a sum of cross sectional areas of the plurality of crystal grains is $0.7 \leq s \leq 0.9$,
   where each of amounts of the elements included in the dielectric layer is expressed in molar parts, when a total of an amount of the Ti, an amount of the Zr, and an amount of the Hf is set to be 100,
   a sum a of the amount of Zr and the amount of Hf is $0 \leq a \leq 1.0$,
   an amount b of the Si is $0.1 \leq b \leq 1.0$,
   an amount c of the Re is $0.5 \leq c \leq 10.0$, and
   a ratio m of a total of an amount of the Ba and the amount of the Re to the total of the amount of the Ti, the amount of the Zr, and the amount of the Hf is $0.990 \leq m \leq 1.050$.
2. The multilayer electronic component according to claim 1, wherein a coefficient of variation of a variation in the thickness of the dielectric layer is less than or equal to 15%.
3. The multilayer electronic component according to claim 1, wherein the second region is surrounded by the first region.
4. The multilayer electronic component according to claim 1, wherein the amount b of Si is $0.1 \leq b \leq 0.5$.
5. The multilayer electronic component according to claim 1, wherein each of the plurality of crystal grains includes a perovskite compound having $Ba(Ti,Zr,Hf)O_3$ as a basic structure thereof.
6. The multilayer electronic component according to claim 1, wherein the Si exists at a grain boundary between the plurality of crystal grains.
7. The multilayer electronic component according to claim 6, wherein the Si is partially dissolved in the plurality of crystal grains in a solid state.
8. The multilayer electronic component according to claim 1, further comprising:
   a first outer electrode on a first end surface of the multilayer body and electrically connected to a first set of inner electrode layers of the plurality of inner electrode layers; and a second outer electrode on a second end surface of the multilayer body and electrically connected to a second set of inner electrode layers of the plurality of inner electrode layers.

* * * * *